United States Patent
Kwong et al.

(10) Patent No.: US 6,721,176 B2
(45) Date of Patent: Apr. 13, 2004

(54) UNIVERSAL HARD DISK CARTRIDGE

(76) Inventors: Bill Kwong, 20363 Leutar Ct., Saratoga, CA (US) 95070; Victor Chuan-Chen Wu, 21055 Lauretta Dr., Cupertino, CA (US) 95014

(*) Notice: Subject to any disclaimer, the term of this patent is extended or adjusted under 35 U.S.C. 154(b) by 0 days.

(21) Appl. No.: 10/014,494

(22) Filed: Dec. 14, 2001

(65) Prior Publication Data

US 2003/0112595 A1 Jun. 19, 2003

(51) Int. Cl.[7] ................................................. G06F 1/16
(52) U.S. Cl. ........................ 361/685; 361/728; 361/736
(58) Field of Search ........................ 361/728, 683–727, 361/730, 736, 748; 360/903; 369/77.2, 78, 80–82

(56) References Cited

U.S. PATENT DOCUMENTS

| | | | | |
|---|---|---|---|---|
| 5,324,204 A | * | 6/1994 | Lwee | 439/64 |
| 5,406,450 A | * | 4/1995 | Shieh | 361/686 |
| RE36,968 E | * | 11/2000 | Shieh | 361/685 |
| 6,154,360 A | * | 11/2000 | Kaczeus et al. | 361/685 |
| 6,324,054 B1 | * | 11/2001 | Chee et al. | 361/685 |
| 2002/0181147 A1 | * | 12/2002 | Tokunaga et al. | 360/97.01 |

* cited by examiner

Primary Examiner—Darren Schuberg
Assistant Examiner—Anthony Q. Edwards
(74) Attorney, Agent, or Firm—Troxell Law Office PLLC

(57) ABSTRACT

A cartridge design allows any standard size IDE hard drive to be used like a removable media. The cartridge with the hard drive can then be connected to any computing devices via various interface ports such as USB, Firewire, PCMCIA, Parallel or any new IO ports. The cartridge consists of a disk connecting board, a cartridge housing and an eject mechanism to remove the hard drive from the cartridge.

3 Claims, 4 Drawing Sheets

Front view

Rear view

US 6,721,176 B2

UNIVERSAL HARD DISK CARTRIDGE

BACKGROUND OF THE INVENTION

1. Field of the Invention

The present invention relates to an universal hard disk cartridge, and particularly the present invention to provide easily changeable hard drive from the universal hard disk cartridge, and not necessary to open the external hard drive housing.

2. Description of Related Art

Data storage devices primary fall into two categories: the removable storage and hard disk storage. These two types of data storage devices offer different advantages depending on the type of applications.

In the removable storage, the storage media can be replaced as more storage space is needed. Cost of the media is relatively inexpensive. But the data transfer rate for removable storage devices in general are much slower than hard disk storage. Thus the removable storage is great for data archiving. To access the data stored on a removable storage media, the computer must have a compatible drive that can read the data from the media. Example, a CDRW drive or CD-ROM drive is needed to access the data on a CDRW media, a DVD drive is needed to access data on a DVD media, a 240 MB-ZIP drive is needed to access data on a 240 MB ZIP media. As a result, in order for a computer to access data on a variety of removable media, it must be equipped with various types of drives.

In the case of hard disk storage, the media and the drive are integrated together. With this design, the data transfer rate for hard drive is much faster than the removable storage. Thus hard disk is great for storing program files, for storing data that are accessed all the time and for streaming video application. Since the hard drive and the storage media are all integrated in one unit, the computer can access the data stored in a hard drive by connecting up the hard disk controller cable and the power cable from inside a computer to the hard drive. But this way of connecting a hard drive to a computer usually requires opening up the computer and technical skill.

External hard drive solves the problem of connecting a drive to a computer without opening up the computers. The external hard drives attach to a computer via one of the common I/O ports on a computer: USB, Firewire or PCM-CIA. Since all the external hard drives are constructed with an enclosure to house the hard drive and the interface electronics. The additional cost of the housing and interface electronics make the external hard drive much more expensive than an internal IDE drive. So when an external hard drive capacity is used up, the user will have to purchase another external hard drive in order to have more data storage capacity. In addition, the external hard drive with this traditional design also limits its use to a single interface. If you have an external USB hard drive, a computer that has no USB port will not be able to use the hard drive.

SUMMARY OF THE INVENTION

The invention in this patent, called "Universal Hard Disk Cartridge", also refer to as UHDC in this patent, significantly improves the cost and flexibility of the external hard drive. The UHDC design also reduce the overall size to almost the size of the hard drive itself. With this invention, users can conveniently add and remove hard drive from the UHDC as if the hard drive is a removable storage media. When the hard drive capacity is filled up, it can be easily removed from the UHDC and replaced with a new hard drive of any capacity, similar to ejecting or removing the floppy media of a floppy drive. The Universal Hard Disk Cartridge is designed with a standard MC-36 connector so that it can be connected to any IO ports of any computing devices via an interface cable with the appropriate interface electronics.

The primary object of the present invention is to provide a cartridge, namely Universal Hard Disk Cartridge (UHDC), which enable to improve in large-scaled of cost reduction and assembly flexibility of external hard disk; also minimize the dimension of external hard disk size to the size of hard disk per se. According to the present invention, the users can easily add or remove the hard disk from UHDC as they have done in CDRW, floppy and other removable storage devices. When the space of hard disk is fully occupied, it can be easily removed from the UHDC and replace with a new one. Furthermore, said UHDC has a MC-36 connector which can connect to any I/O port of PC through proper interface device.

BRIEF DESCRIPTION OF THE DRAWINGS

The present invention can be more fully understood by referring to the following description and accompanying drawings, in which.

DETAILED DESCRIPTION OF THE PREFERRED EMBODIMENTS

Figure 1:
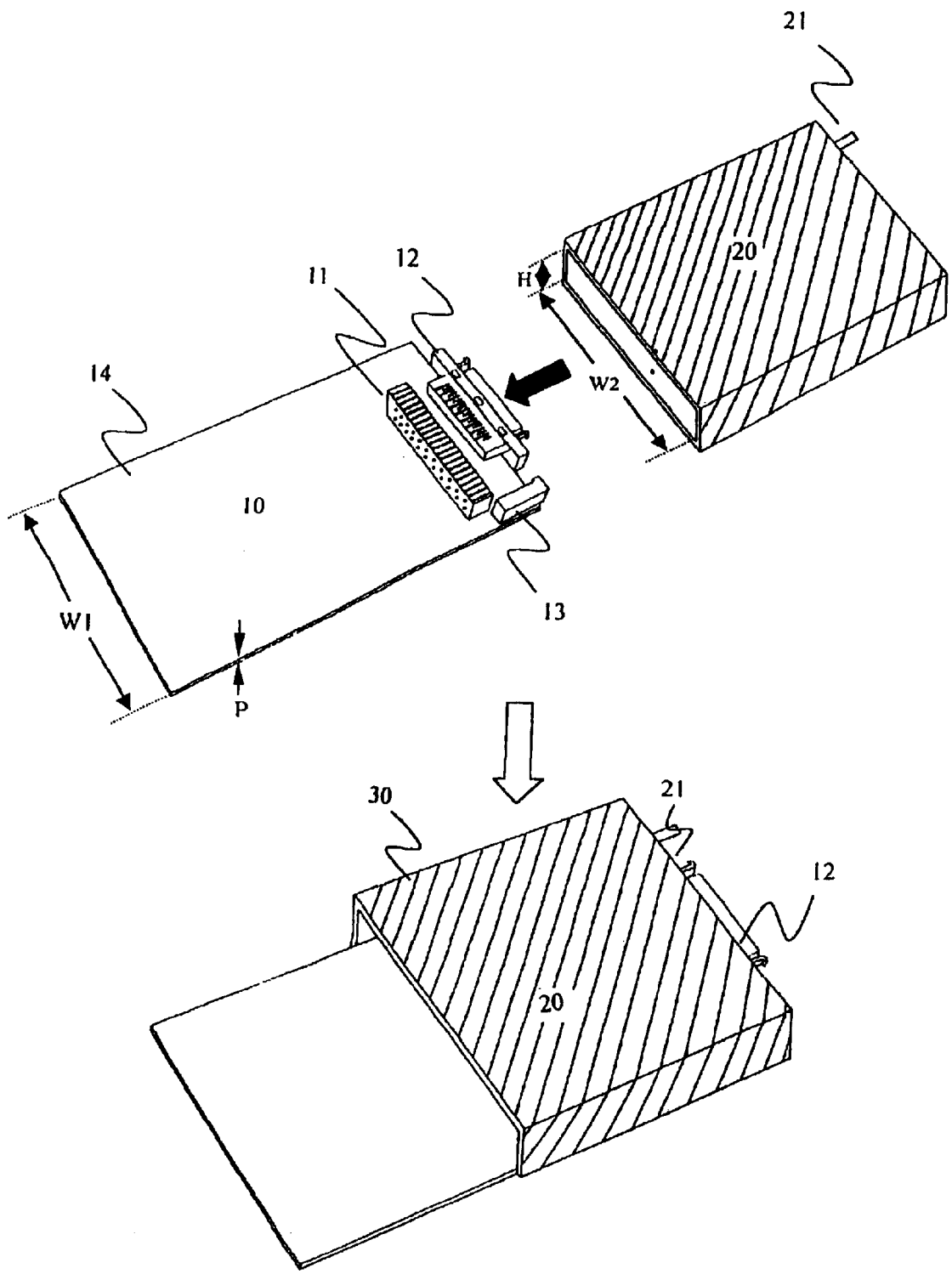
FIG. 1 is the prospective view of the preferred embodiment of the present invention.

Referring to FIG. 1 The Universal Hard Disk Cartridge (UHDC) 30 has two components—the hard disk connecting board 10 and the universal hard disk cartridge housing 20.

Referring to FIG. 1 again, the hard disk connecting board 10 consists of a female IDE connector 11, a MC-36 female connector 12, a power input jack 13 for providing power to the hard drive and a printed circuit board (PCB) 14. The PCB 14 is designed to have the same width (W1) as the width (W3) of the 2.5" hard drive 40 (see FIG. 2). The connector 11 is posited on the PCB 14 such that when the hard drive 40 is installed onto the PCB 14, the edges of the hard drive 40 will line with the edges of the PCB 14 (see FIG. 2).

The universal hard disk cartridge (UHDC) housing 20 has an inside width (W2) the same as the width (W1) of the PCB 14 and the inside height the same as the thickness of the 2.5" hard drive 40 plus the thickness of the PCB (P). The length of the UDHC housing 20 can be from 50% to 100% the length (L) of the PCB 14. The universal hard disk cartridge 30 is then formed by slipping the entire PCB 14 all the way inside the housing 20 till the connector 12 comes out the back of the UHDC housing 20, as illustrated in FIG. 1. The PCB 14 is then secured flat to the bottom of the UHDC housing 20 with strong adhesive or some mechanical fasteners (not shown in the drawing for simplicity).

Figure 2:
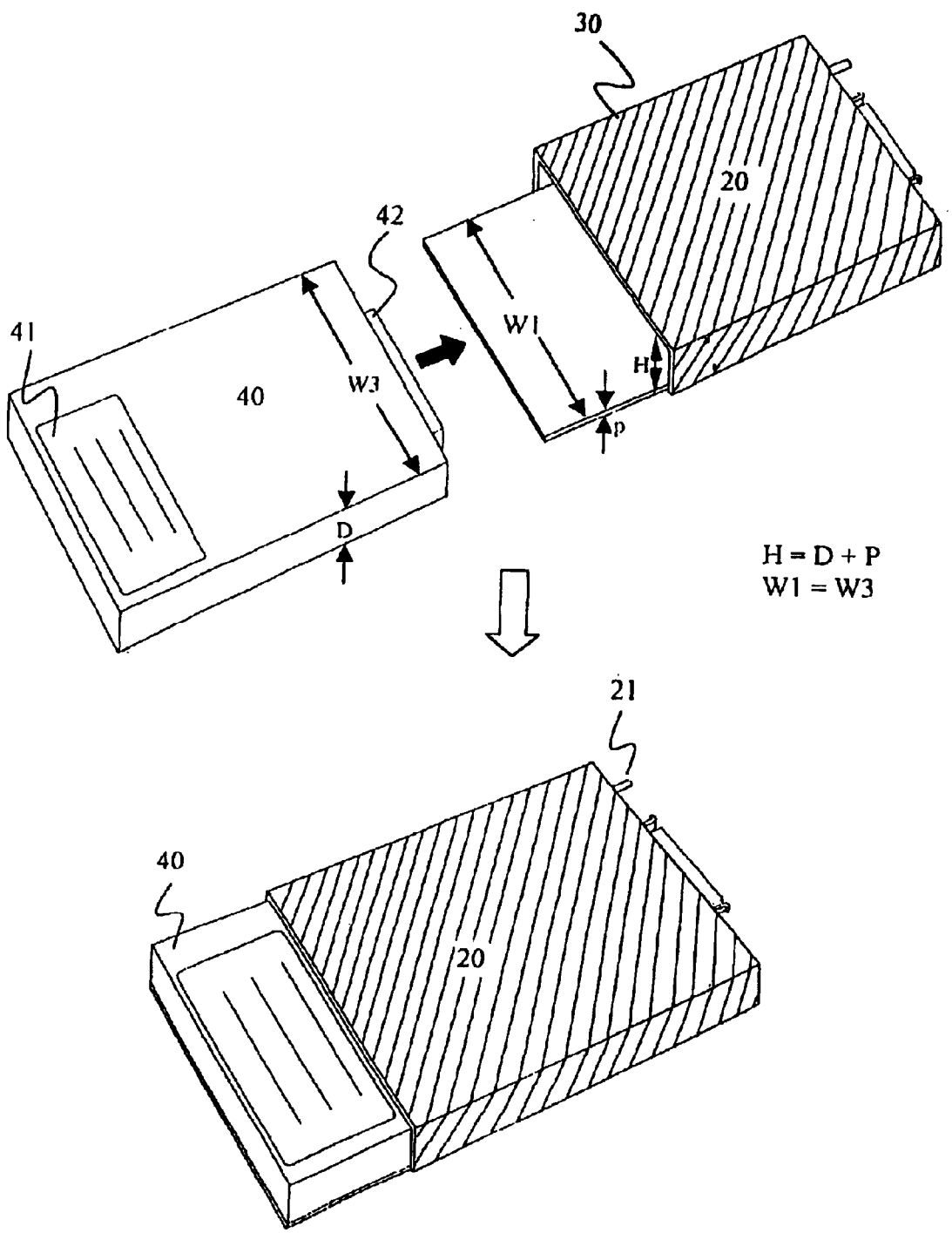
FIG. 2 is the prospective view of insert the hard disk to the UHDC.

To install the hard drive 40 into the cartridge 30, the hard drive 40 is slid inside the cartridge 30 with the connector 42 end of the hard drive 40 heading in, as illustrated in FIG. 2.

The side walls of the cartridge housing 30 serves as the alignment guide so that the male connector 42 of the hard drive always line up to the female IDE connector 11 on the PCB 14 as the hard drive slides into the cartridge and connect up to the female IDE connector 11 inside the cartridge 30. The hard drive 40 is then push snugly all the way inside the cartridge 30 till the end of the hard drive 40 is fully line up with the outside edge of the PCB 14, indicating the hard drive 40 is now securely connected up mechanically and electrically with the hard disk connector board 10. Now the hard drive 40 will be held in place inside the UHDC by the frictional force between the male IDE connector 42 and the female IDE connector 11. The hard drive 40 can be removed from the UHDC by pushing on the ejecting button 21. Similar to other removable media, a label 41 can also be applied to the top surface of the hard drive to quickly identify the content of the hard drive 40.

Figure 3:
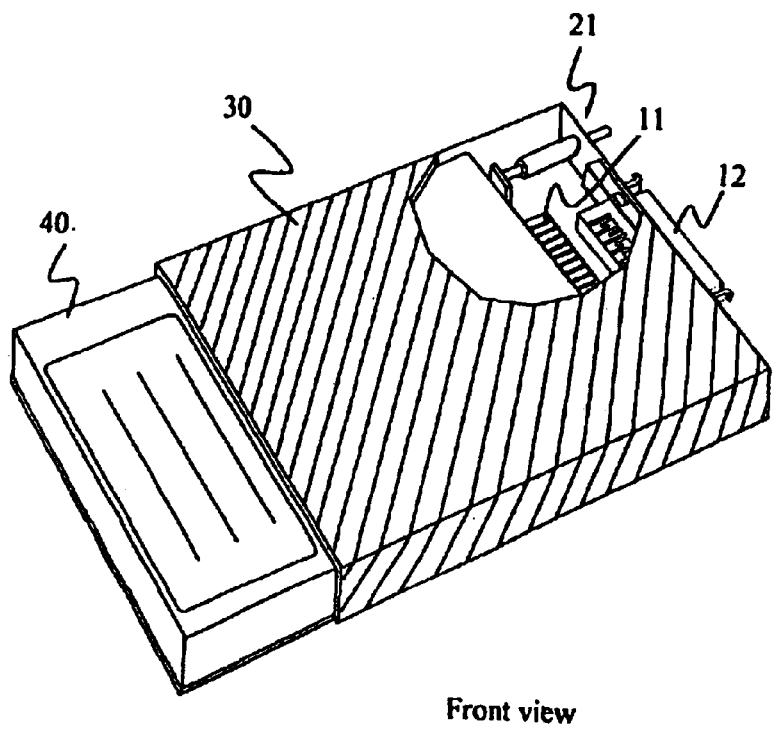
FIG. 3 is the prospective view of insert and eject of the hard disk.
Figure 3:
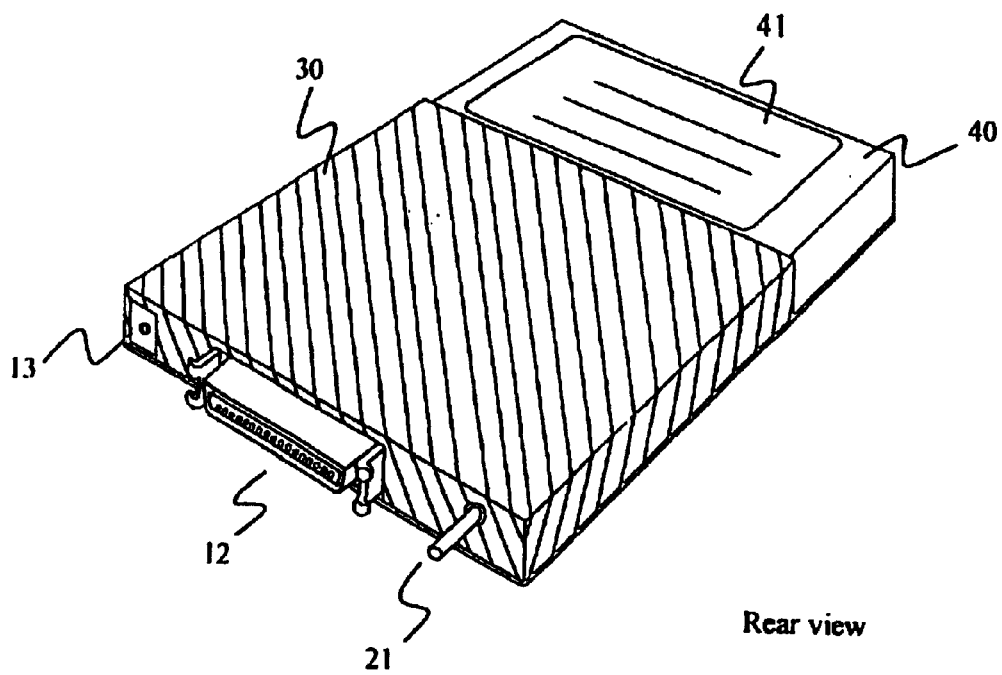

FIG. 3 front view shows how the hard drive sits inside the UHDC and the detail of the eject button. Many other mechanical eject designs can also be used to dislodge the hard drive from inside the UHDC. In FIG. 3, rear view also shows how the connector 12, power input connector 13 and the eject button 21 come out the back end of the UHDC.

Figure 4:
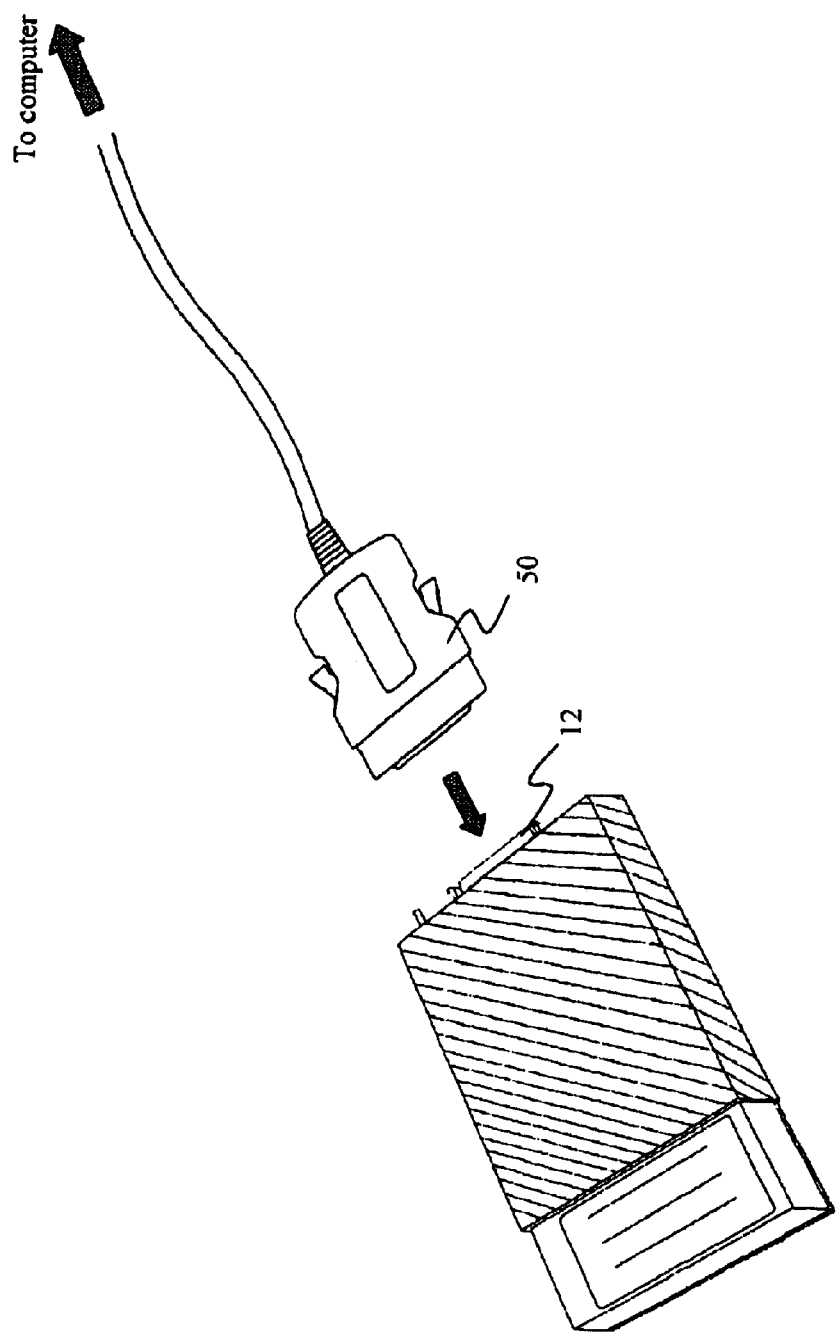
FIG. 4 is the prospective view of the UHDC connects to the computer.

The UHDC with the hard drive 40 installed can now be attached to interface cable 50 via the MC-36 connector 12 as shown in FIG. 4. The interface cable 50 can either be an USB, PCMCIA, Firewire or IDE cable interface cable to match the IO port on the computer, Which is not shown here for simplicity.

Below is a comparison for external data storage devices constructed with Traditional Data Storage Enclosures verses the storage device constructed with Universal Storage Cartridge design:

| Universal Hard Disk Cartridge | Traditional External Hard Drive |
|---|---|
| The housing is one piece design which substantially reduce the tooling cost | The housing consists of two pieces which result in more expensive tooling. |
| Hard drive can be installed and removed on the fly from the cartridge. As the hard drive space is filled up, it can be easily replaced with another fresh hard drive. | Installation and removal of the hard drive usually requires special tools to disassembling and reassembling the housing, making it impractical to replace the hard drive inside the enclosure. |
| Less material cost as the cartridge enclosure typically half of that of the traditional external storage enclosure | Higher material cost as more material is needed for the enclosure |
| Low manufacturing cost as the storage device is added to the cartridge with simple insertion, similar to loading a floppy media into a floppy drive. | Higher manufacturing cost as assembly is required to install the storage device inside the enclosure. |
| Smaller in size | Larger in size |
| Can add visible label on the storage device for easy identification of the content stored in the drive | Cannot add visible label to the hard drive as it is completely enclosed. |
| Hard drive can be easily ejected out of the cartridge housing with an eject button design. | Removal of hard drive from the enclosure requires disassembly in the enclosures. |

Although the invention in this patent described a design specifically for a 2.5" hard drive, the concept can easily be applied to a 3.5" hard drive and other ATAPI storage devices.

While the invention has been described with reference to preferred embodiment thereof, it is to be understood that modifications or variations may be easily made without departing from the spirit of this invention, which is defined by the appended claims.

What is claimed is:

1. A universal hard disk cartridge for inserting a removable hard drive and connecting to a I/O port of a personal computer by an interface cable comprising:

a) a universal hard disk cartridge housing; and
   b) a hard disk connecting board connected to the universal hard disk cartridge housing such that a portion of the hard disk connecting board extends out of a first side of the universal hard disk cartridge housing, the hard disk connecting board having:
      i) a female IDE connector configured to be removably connected to a male IDE connecter of the hard drive;
      ii) a MC-36 female connector having a portion extending outwardly of a second side of the universal hard disk cartridge housing, and configured to be removably connected to a MC-36 male connector of the interface cable;
      iii) a power input jack; and
      iv) a printed circuit board, the female IDE connector, the MC-36 female connector and the power input jack being connected to the circuit board, wherein the universal hard disk cartridge housing has a length less than a length of the printed circuit board.

2. The universal hard disk cartridge for inserting the removable hard drive and connecting to the I/O port of the personal computer by the interface cable according to claim 1, wherein the universal hard disk cartridge housing has an ejection button such that the removable hard drive is detached from the hard disk connecting board by pushing the ejection button.

3. The universal hard disk cartridge for inserting the removable hard drive and connecting to the I/O port of the personal computer by the interface cable according to claim 1, wherein the hard disk has an identification label.

* * * * *